(12) United States Patent
Puget et al.

(10) Patent No.: US 9,381,422 B2
(45) Date of Patent: Jul. 5, 2016

(54) GLIDING BOARD WITH A DAMPING DEVICE

(71) Applicant: SKIS ROSSIGNOL, Saint-Jean de Moirans (FR)

(72) Inventors: Nicolas Puget, Novalaise (FR); Arnaud Moenne Loccoz, Saint-Jean de Moirans (FR); Benjamin Talon, Cahors (FR); Yan Chabrerie, Sainte Fortunade (FR)

(73) Assignee: SKIS ROSSIGNOL, Saint-Jean de Moirans (FR)

( * ) Notice: Subject to any disclaimer, the term of this patent is extended or adjusted under 35 U.S.C. 154(b) by 0 days.

(21) Appl. No.: 14/793,518

(22) Filed: Jul. 7, 2015

(65) Prior Publication Data

US 2016/0008697 A1    Jan. 14, 2016

(30) Foreign Application Priority Data

Jul. 9, 2014    (FR) ...................................... 1456594

(51) Int. Cl.
| | |
|---|---|
| *A63C 5/06* | (2006.01) |
| *A63C 5/07* | (2006.01) |
| *A63C 5/075* | (2006.01) |
| *F16F 9/516* | (2006.01) |
| *F16F 9/20* | (2006.01) |

(52) U.S. Cl.
CPC ................ *A63C 5/075* (2013.01); *A63C 5/062* (2013.01); *F16F 9/20* (2013.01); *F16F 9/516* (2013.01)

(58) Field of Classification Search
CPC .................................... A63C 5/06; A63C 5/07
See application file for complete search history.

(56) References Cited

U.S. PATENT DOCUMENTS

| | | | | |
|---|---|---|---|---|
| 5,779,257 A | * | 7/1998 | Bonvallet ............... | A63C 5/075 280/602 |
| 6,676,151 B2 | * | 1/2004 | Mangold ................ | A63C 5/075 280/602 |
| 2005/0073131 A1 | | 4/2005 | Krumbeck et al. | |

FOREIGN PATENT DOCUMENTS

| | | |
|---|---|---|
| EP | 2138208 A1 | 12/2009 |
| FR | 1228793 A | 9/1960 |
| FR | 1407710 A | 8/1965 |
| WO | WO-03041819 A1 | 5/2003 |

OTHER PUBLICATIONS

Search Report for FR 1456594, dated Feb. 25, 2015.

* cited by examiner

*Primary Examiner* — Bryan Evans
(74) *Attorney, Agent, or Firm* — Marshall, Gerstein & Borun LLP

(57) ABSTRACT

Gliding board with a damping device for the vertical movements of the front or rear zone of the board said system including an arm whose first end is integral with an attaching point located in the front or rear zone of the board and whose second end is integral with the piston of a hydraulic device connected to the board near the attachment, said hydraulic device applying a retaining force during the movement of the second end of the arm in order to dissipate part of the kinetic energy from the front or rear zone of the board transmitted by said arm, wherein when the movement of the arm is consecutive to the movement of the attaching point downwards, the hydraulic device applies a retaining force which is less than the force applied when the movement of the arm is consecutive to a movement of the attaching point upwards.

19 Claims, 8 Drawing Sheets

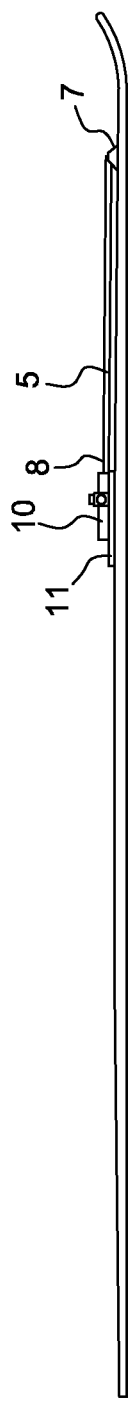
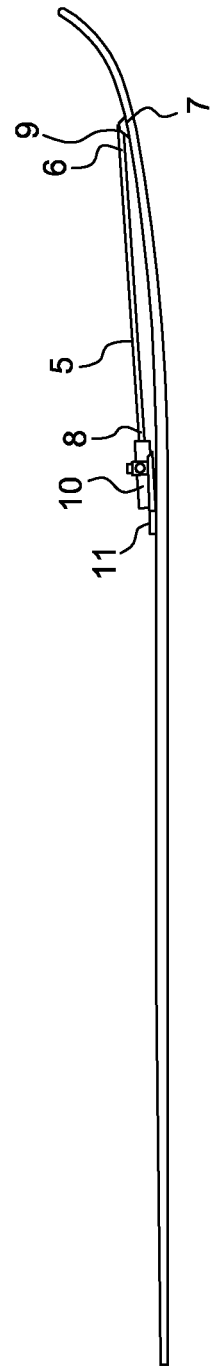
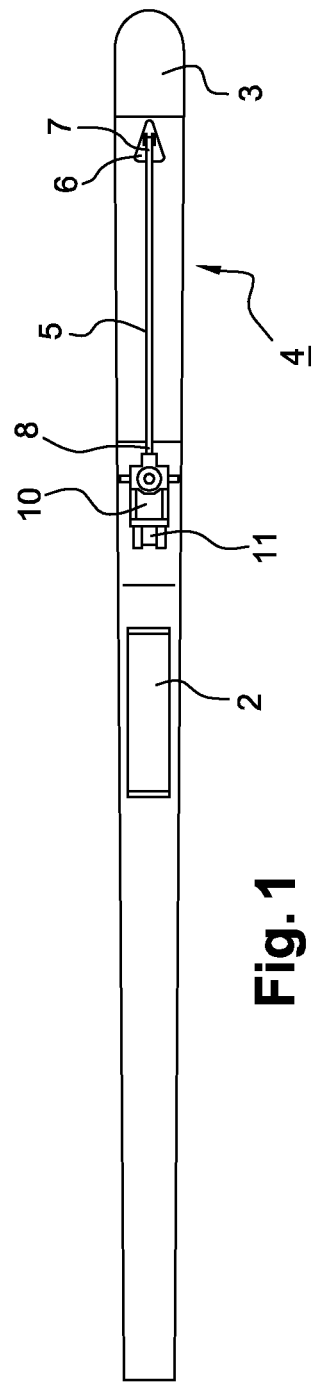
Fig. 2
Fig. 3
Fig. 1

GLIDING BOARD WITH A DAMPING DEVICE

CROSS-REFERENCE TO RELATED APPLICATIONS

This application claims the benefit of priority under 35 U.S.C. §119 of French patent Application No. FR 1456594, filed Jul. 9, 2014, and entitled "Gliding Board with a Damping Device," which is hereby incorporated herein by reference in its entirety and for all purposes.

TECHNICAL FIELD

The present disclosure relates to the field of sports involving sliding. More specifically, it concerns special arrangements made to damp the movements of the tip of a gliding board. More particularly it concerns gliding boards with hydraulic damping devices. Although it is more specifically described for its application to an alpine ski, the present disclosure also describes other types of gliding boards, in particular snowboards.

BACKGROUND

In general, it is known that the tip of a ski is exposed to many vibration phenomena. These vibrations are caused by the fact that the ski is moving over a surface containing obstacles which raise the end of the ski because of its relative flexibility. On the other hand, gravity tends to pull the tip of the ski down, causing chattering phenomena to occur.

These chattering phenomena may extend for varying lengths of time depending on the mechanical properties of the ski and especially on its stiffness and damping.

It is easily understood that these chattering phenomena are not propitious to good control of the gliding board and accordingly, many damping devices have been proposed to limit the amplitude and above all the duration of the vibration phenomena affecting the tip of the board.

One interesting solution was proposed in document FR 1 407 710 which describes a ski with a damping system comprising an arm of which one end
is integral with a fixed point in the front part of the ski. The rear part of this arm is integral with a hydraulic device comprising a piston and whose movement is ensured by the arm according to the deformation of the ski.

Accordingly, the upward or downward movements of the front end of the ski are braked in the same way by the action of the hydraulic actuator.

The symmetrical behaviour of this damping action, for upward or downward movements, is not entirely satisfactory. Indeed, if the damping becomes excessive, it tends to obstruct the downward movements of the tip of the ski thus delaying its recovery of a position in contact with the ground. Conversely, when damping is insufficient, the upward movements of the board are not braked sufficiently.

In other words, it can be understood that a compromise must be found in choosing the damping value to obtain differentiated behaviour depending on whether the damping movements are upwards or downwards.

A more fully integrated system is described in document U.S. Pat. No. 7,296,818 but it operates according to a similar principle, incorporating the same drawbacks, however.

SUMMARY OF THE DISCLOSURE

Therefore, the presently described embodiments aim at optimizing the behaviour of the gliding board with respect to the damping of the tip movements, more particularly in such a way as to facilitate its control.

Therefore, the presently described embodiments concern a gliding board with a damping system on the vertical movements of the front or rear zone of the board. This system has an arm the first end of which is integral with an attaching point integral with the front or rear zone of the board and a second end integral with a piston of a hydraulic device connected to the board near the attachment.

This hydraulic device applies a retaining force during the moment of the second end of the arm, to dissipate part of the kinetic energy from the front or rear zone of the board, transmitted by the arm.

In conformity with the presently described embodiments, this gliding board is characterized in that, when the movement of the arm is consecutive to a downward movement of the attaching point, the hydraulic device applies a retaining force which is less than the force applied when the arm movement is consecutive to an upward movement of the attaching point.

In other words, the presently described embodiments consist in fitting the gliding board with a damping device whose performance is symmetrical and which thus damps more the upward movements of the board tip while, to the contrary, damping little its downward movements. In a conventional manner, the retaining force of a hydraulic damping device such as this is firstly proportional to the speed of movement of the arm. In other words, gliding board bending movements are damped more, when the board bends with the tip rising, compared to the counter-flexing movement when the board deflects in the opposite direction. Naturally, the same damping system can be installed at the tail of the board to limit the tail movements with the corresponding dimensional adaptations.

Accordingly, a scheme conforming to the presently described embodiments offers improved behaviour because the upward movements of the tip are relatively limited whereas the inverse movements, designed to press the tip against the snow are damped less, thus ensuring the faster return of the board into contact with the snow.

Advantageously, in actual practice, for a ski, the hydraulic device is placed at the front of the attachment stop which, on one hand, limits the addition of extra weight to the front tip of the ski, while increasing the length of the front end movement transmission arm. It is also possible for the hydraulic device to be arranged underneath the ski attachment, for instance, inside a suitable platform. To limit the overall dimensions of the hydraulic device, it could be considered to incorporate it, at least partially, inside the structure of the ski. In a preferential embodiment, the front end of the arm would be placed in a zone with considerable deflation amplitude and privilege will be given to the anti-nodes of the main vibration modes. The zone near the front contact line is privileged in benefiting from the greatest length of the arm. It is also possible to install the front end at the board.

In one particular embodiment, the damper system can include a demultiplication mechanism based on connecting rods or a similar arrangement, to increase the stroke of the rear end of the arm, working together with the hydraulic device. Preferably, this type of mechanism will be added as far as possible from the end where the attaching point is located, so as not to generate extra weight at this end of the board.

To limit the influence of the damping system on the flexing stiffness of the board, preference will be given to solutions in which the first end of the arm is connected to the forward zone of the board by a swiveling link as well as those in which the hydraulic devices connected to the upper face of the ski also include a swiveling link. In particular, this would make it possible to create solely a pure longitudinal translation movement, without any unwanted vertical or bending component.

One particular solution concerning the hydraulic device consists in using a device having a main chamber inside which the piston can be moved with the piston dividing the main chamber into a compression chamber and a relief chamber.

This device includes two independent hydraulic paths connecting the compression chamber and the relief chamber with two paths working in opposite directions and having different load losses.

In other words, the flexing movement induces the circulation of fluid in the hydraulic device of the compression chamber to the relief chamber by a first hydraulic path while the counter-bending movement causes the fluid to move from the relief chamber to the compression chamber, by a second different hydraulic path, having different flow characteristics and therefore different damping capability.

In practice, the selection of an active hydraulic power for each of the movements uses anti-return valves installed on each of the hydraulic paths, with the valves assembled in opposite directions.

The damping difference between the two movements can be obtained by using flow reducers having different sections, installed on each of the hydraulic paths.

These flow reducers can be obtained advantageously by grub screws, preferably adjustable, to allow optimal damping adjustment for the two characteristic movements.

According to one variant of the hydraulic device, it can include:
 a main chamber inside which the piston can move, with the said piston dividing the said main chamber into a compression chamber and a relief chamber with said piston being pierced by a hydraulic channel connecting the compression and relief chambers together;
 a complementary chamber having a variable volume, connected to the compression chamber by an anti-return valve and a hydraulic restriction.

In this configuration, the movement of the piston inside the main chamber causes the fluid to flow between the compression chamber and the relief chamber on the one hand, but also between the compression chamber and the complementary chamber which is connected to it by a hydraulic arrangement. The hydraulic link between the compression chamber and the complementary chamber uses two separate paths, behaving differently according to the direction of fluid flow. Accordingly, the anti-return valve only opens in one direction of fluid flow whereas the hydraulic restriction is exposed to a similar flow in the opposite direction of fluid flow.

In one particular embodiment, the hydraulic device includes a mechanism for adjusting the diameter of the hydraulic restriction. Under these conditions, the flow circulating in one direction or the other can be adjusted, between the complementary chamber and the compression chamber, so that the damping value generated by the movement of the piston is adjusted.

According to one variant of the embodiment, the main chamber can be connected to a compensation chamber arranged to receive fluid from the main chamber under the effect of temperature.

Because the board is designed to evolve in a wide range of temperature conditions, the fluid taking up the main chamber may be caused to expand and therefore be found in a compensation chamber forming an additional volume, not influencing the fluid flow movements. In parallel, the fluid moved by the piston can heat up when the system is under great solicitation and therefore expand. Similarly, the variations of altitude to which the ski is exposed can cause the expansion of gas fractions dissolved in the fluid, taken up by the compensation chamber.

In practice, this compensation chamber can include a piston associated with return means applying force equivalent to the force applied by the expansion of the fluid.

According to another characteristic of the presently described embodiments, the damping system can have means of limiting the stroke of the arm in the event of the fixed point moving downwards. In other words, the damping system can be connected so that the downward movement of the ski tip is locked when the ski tip which is an optimal position, corresponding approximately to the position in which it is in contact with the snow.

In other words, movements of the ski tip downwards are prevented from continuing for too long, and maintaining the chatter which could disturb the control of the board.

Various different embodiments can be considered to ensure this on travel limiting effect. Accordingly, in a first alternative, limitation is caused by the presence of a stop mounted on the arm and coming into contact with a fixed section of the hydraulic device when the arm moves. In other words, the movement of the arm is stopped in one direction by the presence of a device which abuts against the hydraulic device, and in particular the external case of the hydraulic device.

It is also possible that the limitation is determined by a stop mounted inside the main chamber, confining the stroke of the piston in the event of the stationary point moving downwards.

In other words, in this case, the piston acts as a stop by coming into contact with the bottom of the hydraulic device chamber. In another embodiment, this stop might not be hydraulic, to dampen more gently the end of the arm. This configuration generates additional retaining force which is proportional to the speed and movement of the arm.

BRIEF DESCRIPTION OF THE FIGURES

The manner of implementing the presently described embodiments, and the resulting advantages will appear clearly in the description of the embodiment which follows, supported by the attached illustrations in which:

FIG. 1 is a top view of a ski complying with the presently described embodiments.

FIGS. 2 and 3 are side views of the ski of FIG. 1, shown in two different bending configurations.

DETAILED DESCRIPTION

Figure 4:
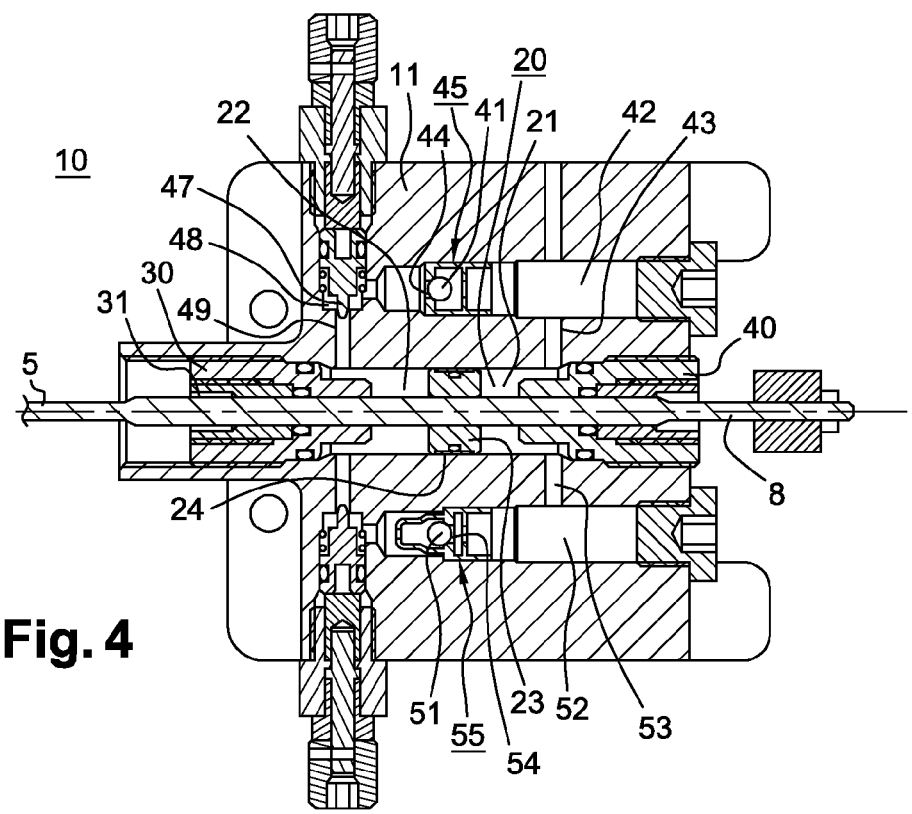
FIGS. 4 to 7 are sectional views in a horizontal plane of a first embodiment of the hydraulic device, shown in four different positions.

As illustrated schematically in FIG. 1, a ski conforming to presently described embodiments 1 includes a zone 2 in which the attachment is located, materialised by a platform.

This ski also has a front end 3 or tip liable to move up or down depending on the bending stiffness of the board and the obstacles encountered in its path.

In conformity with the presently described embodiments, the ski 1 includes a damping device 4. This device 4 consists essentially of an arm 5 extending longitudinally and whose front end 6 is connected to a plate 7 mounted permanently to the upper face of the ski, near the tip. In practice, the length of the arm can be approximately 500 to 700 mm long, inducing the movement of the rear end by approximately 2 to 5 mm. In the case of the use of a demultiplication mechanism, this movement can be greater, reaching approximately 10 mm. It will be seen that the longer the arm, the more the efficiency of the damper will be optimised. The transversal axis is placed preferably near the front contact line defined in standard ISO 6289 and typically between 20 and 60 mm from this point.

The rear end 8 of arm 5 itself works together with a hydraulic device 10 which is made integral with the upper face of the ski by means of a plate 11. More accurately, and as illustrated by FIGS. 2 and 3, the front end 6 of arm 5 is mounted to rotate about a swiveling axis 9, placed transversely with respect to the ski on a clevis 8, integral with a base 7, itself attached to the upper face of the board.

This enables the arm 5 to move more freely during the bending movements of the ski as illustrated in FIG. 3. As a complement to this, hydraulic device 10 is also assembled with a swiveling axis with respect to plate 11, enabling it to lift off the upper face of the ski if the ski bends as shown in FIG. 3, allowing arm 5 to move inside hydraulic device 10.

One particular embodiment of hydraulic device 10 is shown in FIG. 4.

In a simplified manner, this hydraulic device 10 includes a body 11 inside which a main chamber 20 is defined and within which a piston 23 is able to move. Main chamber 20 consists of two chambers separated by piston 23, that is a compression chamber 21 and a relief chamber 22. This piston 23 has a seal 24 ensuring sealing between compression chamber 21 and relief chamber 22. The chamber is filled with a hydraulic fluid, in particular a low-temperature hydraulic oil whose viscosity properties are not excessively modified within the operating range of the ski.

The main chamber 20 is blanked at the front by a plug mechanism 30 having an opening 31 at the centre, allowing the end of rear pin 8 of arm 5 to pass through it.

The arm 5 passes longitudinally through the compression and relief chambers and the piston 23 is attached rigidly to the stem of arm 5. Arm 5 and end 8 inside the hydraulic damper can be a monobloc structure or be connected by a rigid mechanical link, possibly adjustable for longitudinal translation, for instance of a screw and nut system type, to adjust the length of arm 5 and act on the lifting of the ski tip.

Sealing means 26 are provided to enable the arm 5 to translate at plug 30, and therefore piston 23 to move.

At the rear, the main chamber is blanked by a similar plug system allowing the rear end 8 of arm 5 to pass so that the arm can possibly extend from the damper case at the rear towards the ski attachment 2.

This damper with its through rod offers the advantage of not needing to compensate for the volume of the rod. The pressure on the compensation volume is therefore not influenced by the rod.

As shown in FIG. 4, the compression chamber 21 connects with a small intermediate chamber 42 by means of a channel 43. This first intermediate chamber 42 connects through an anti-return device 45 with a flow reducer 46. The anti-return device 45 consists of a ball 41 which blocks or does not block the hole 44. It is arranged in such a way that the flow of fluid is allowed from the flow reducer 46 to chamber 42 only.

The flow reduction device 46 has a channel 47 through which the flow of fluid can be reduced to a greater or lesser extent, adjusted by a grub screw 48. The flow reduction device 46 is connected by a channel 49 to relief chamber 22.

In addition, compression chamber 21 connects via channel 53 to a second intermediate chamber 52. This intermediate chamber 52 connects by an anti-return device 55 with a flow reducer 56. Anti-return device 55 consists of a ball 51 which blocks or does not block the hole 54. It is arranged so that the flow of fluid is allowed from chamber 52 to flow reducer 56 only. The flow reducing device 56 includes a channel 57 through which the passage of fluid can be reduced to a greater or lesser extent, adjustably by a grub screw 58.

The flow reduction device 56 connects through channel 59 to relief chamber 22.

In FIG. 4, piston 23 is shown in an intermediate position defining relief and compression chambers which have approximately the same volume.

Figure 5:
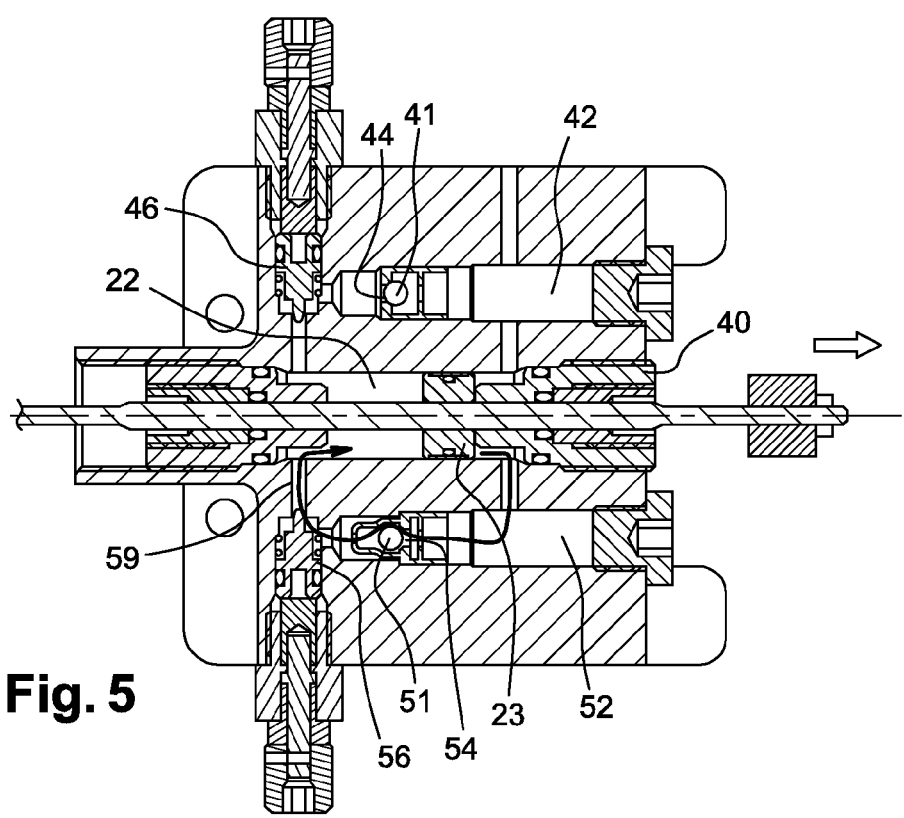
Figure 6:
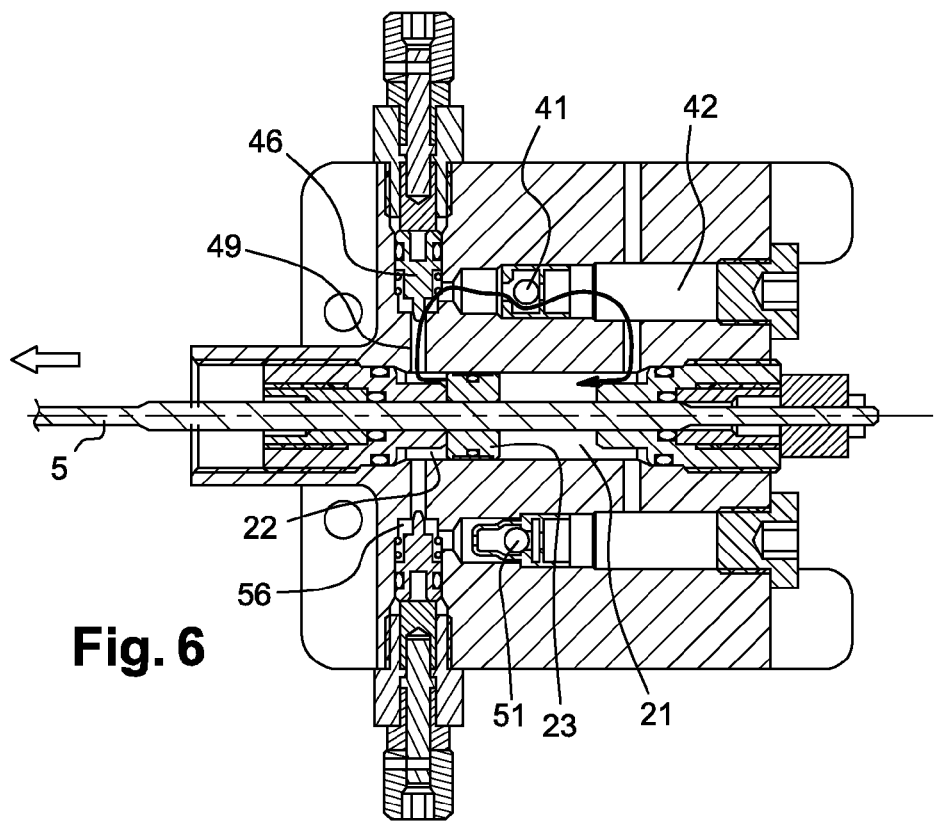
Figure 7:
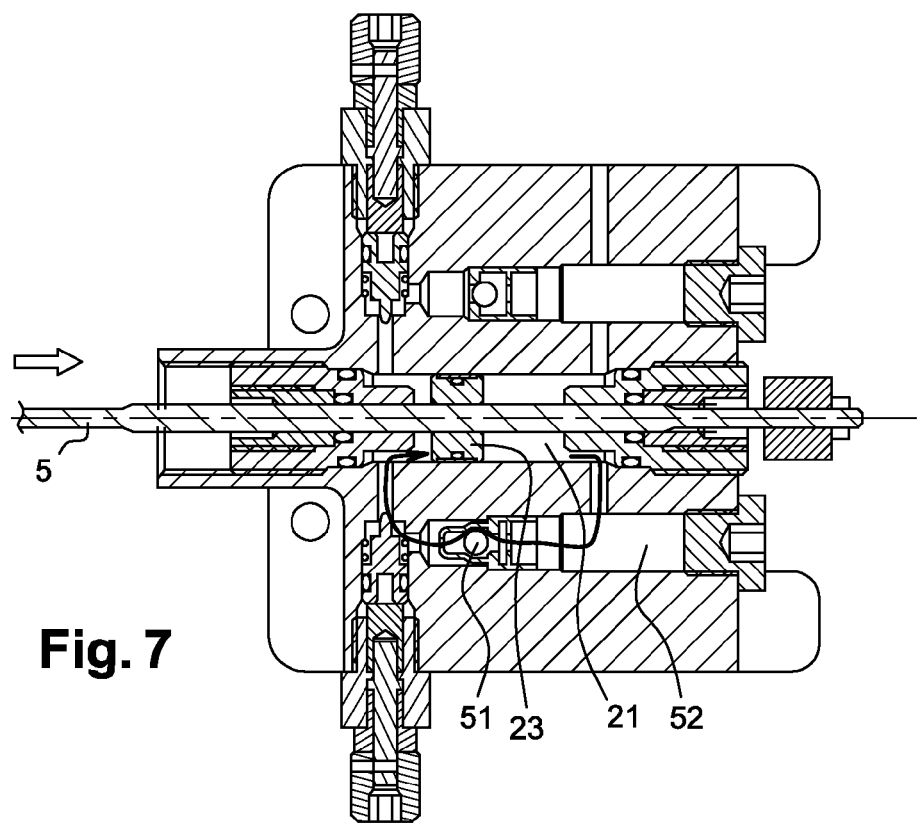

FIGS. 5 to 7 illustrate the operation of the device according to the deformations of the board and therefore the movement of arm 5. Accordingly, in the configuration illustrated in FIG. 5, piston 23 moves towards the rear therefore pushing the fluid back in the second intermediate chamber 52, anti-return valve 55 allows the fluid to pass as far as flow reducer 56 which is blanked off to some extent, generating relatively high load losses. Flow reducer 56 therefore enables the fluid to return to relief chamber 22 by means of channel 59.

In the configuration shown in FIG. 5, the piston abuts against plug 40 so that the upward movement of the ski tip is blocked.

It will be seen that because of the orientation of the anti-return valve 45, the fluid can no longer circulate through the first intermediate chamber 42 and the first flow reducer 46. FIG. 6 illustrates an opposite configuration in which the front end of the ski moves downward, causing arm 5 is to be pulled forward. In this case, piston 23 moves so as to compress the fluid contained in relief chamber 22. The fluid then circulates through channel 49 as far as flow reducer 46. The anti-return valve 45 is then open and the ball 41 is cleared from the hole 44, allowing the fluid to pass through the first intermediate chamber 42 and return to compression chamber 21.

It is noteworthy that because of the configuration of the anti-return valve 55, the second hydraulic path, passing through the second flow reducer 56, is closed.

It will also be seen that in the configuration of FIG. 6, piston 23 abuts against plug 30, thus preventing the movements of arm 5 and the downward excursion of the ski tip. In particular, it is advantageous to position this stop so that the stroke of the arm is stopped when the ski tip is flat on the snow.

The flow reducer 56 regulates the flow of fluid and therefore the damping of the ski in the bending direction during movements of the front end of the ski upwards. Conversely, the flow reducer 46 regulates the flow of fluid and therefore the damping of the ski in the counter-bending direction, during downward movements of the front tip of the ski.

It will be observed that the flow reducer 46 is relatively slightly closed and in any case, less than flow reducer 56 so that the damping of the arm movement in this direction is smaller than in the configuration illustrated in FIG. 5.

In particular, one advantageous configuration is to adjust the flow reducer is so that the bending ski damping action (corresponding to the action of the compression rod on the hydraulic damper) is between two and three times greater than the damping of the scheme during counter-bending (corresponding to the action of the rod relieving the hydraulic damper) for the same solicitation speed of the damper so that the ski performance is enhanced in that the tip remains locked to its path in the snow without breaking away from this curve under the effect of unwanted vibration.

Subsequently, as shown in FIG. 7, arm 5 operates and thus moves piston 23 in the main chamber. The pressure in the compression chamber 21 becomes greater than the pressure prevailing in the relief chamber and the hydraulic path through the intermediate chamber, the anti-return valve 55 and the flow reducer 56 is active.

Figure 9:
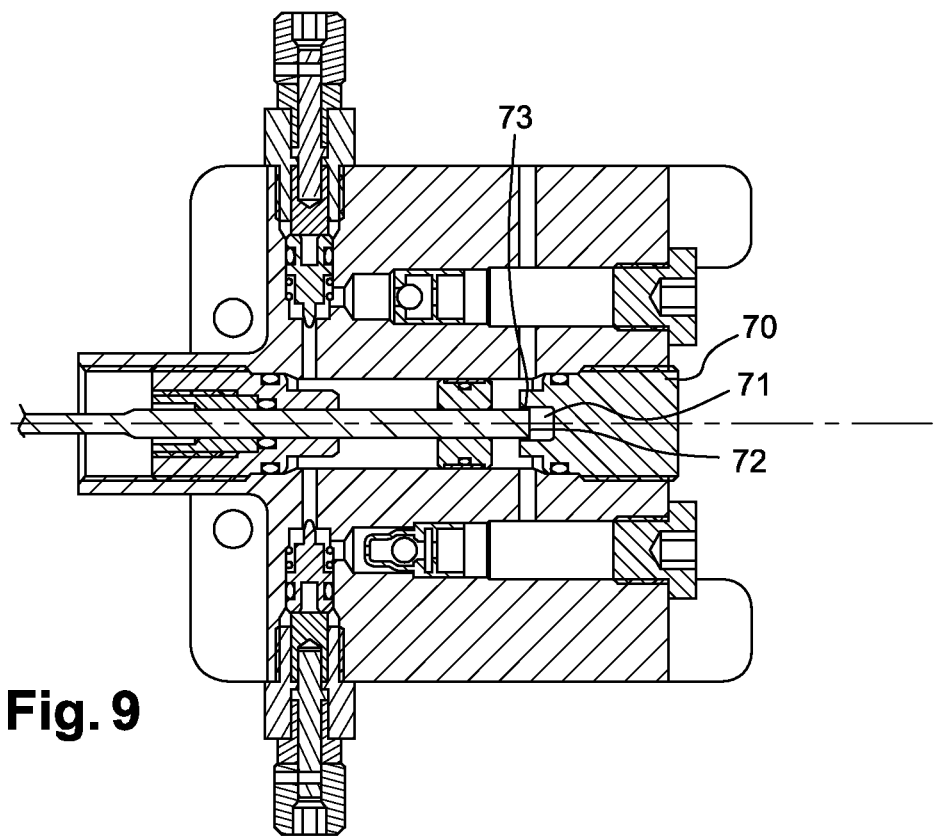
FIG. 9 is a sectional view, similar to FIGS. 4 to 7, showing an alternative embodiment of the principle of arm movement limitation.

In an alternative embodiment illustrated in FIG. 9, arm end 72 supporting the piston enters a housing 71 formed in plug 70. This housing has a diameter slightly larger than that of the end 72 of the arm. In this way, the clearance 73 between the arm and the walls of the housing is reduced. Accordingly, when the arm moves towards the bottom of the housing, it expels the fluid through the small clearance 73, with an increased retaining force, generating the effect of a hydraulic stop.

Figure 8:
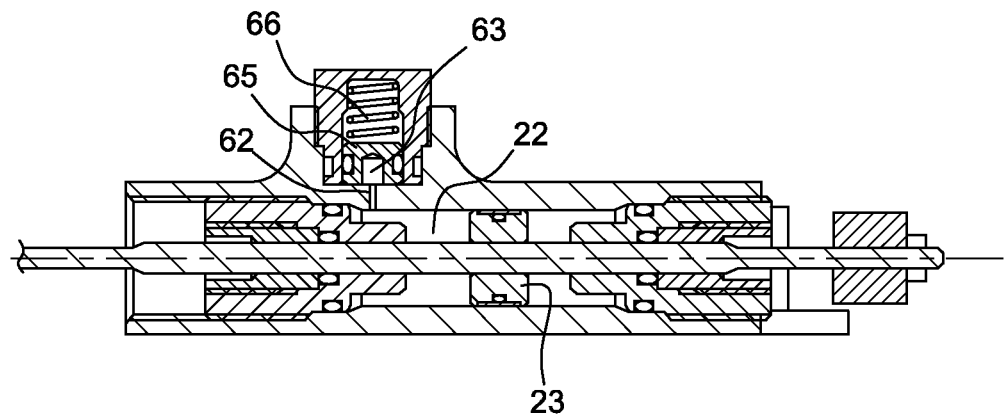
FIG. 8 is a longitudinal sectional view on a vertical plane of the hydraulic device shown in FIGS. 4 to 7.

Another characteristic of the presently described embodiments, illustrated in FIG. 8 is that the relief chamber 22 is connected by a channel 62 to a compensation chamber 63. This compensation chamber 63 has a variable volume because it is equipped with a piston 65 capable of moving upwards. Piston 65 is supported by a return spring 66 which is calibrated to allow the movement of piston 66 solely for very high pressure levels, corresponding to expansion or pressure phenomena due essentially to the altitude. Indeed, it is important for the volume of the compensation chamber to vary only for very high pressure levels and not for the variable pressure levels observed when the pressure increases in the relief chamber because of the movement of piston 23.

As far as the damping coefficients considered advantageous in the ski domain are concerned, with respect to the compression, the factor is included between 0.2 and 1 N/mm·s whereas at the relief level, it is included between 0.4 and 2 N/mm·s.

Naturally, different geometrical configurations can be used and the presently described embodiments is not confined solely to the architecture illustrated in the figures. Accordingly, the grub screws 48, 58 are adjusted as shown in FIGS. 4 to 7, by a mechanism moving horizontally with adjustment of the grub screw position by a side screw but it could also be imagined that the flow reduction device be orientated on a vertical axis with the adjustment of the grub screw position by a screw accessible from the top.

In this way, the compensation chamber shown in FIG. 8 has been provided to connect with the relief chamber but it would also be possible to connect it to the compression chamber.

FIGS. 10 to 13 illustrate a second embodiment in which the hydraulic device is constructed in a compact design, generally cylindrical in shape. More specifically, device 104 shown in FIG. 10 includes essentially an arm 105 the front end 106 of which is equipped with an attaching system 107 forming a swiveling link designed for mounting on a plate similar to plate 7 of FIG. 2. The rear end 108 of arm 105 is connected to the hydraulic device 110 whose opposite end 111 has a swiveling link designed to allow it to be mounted to the upper face of the ski by means of a plate similar to plate 11 of FIG. 2.

Figure 10:
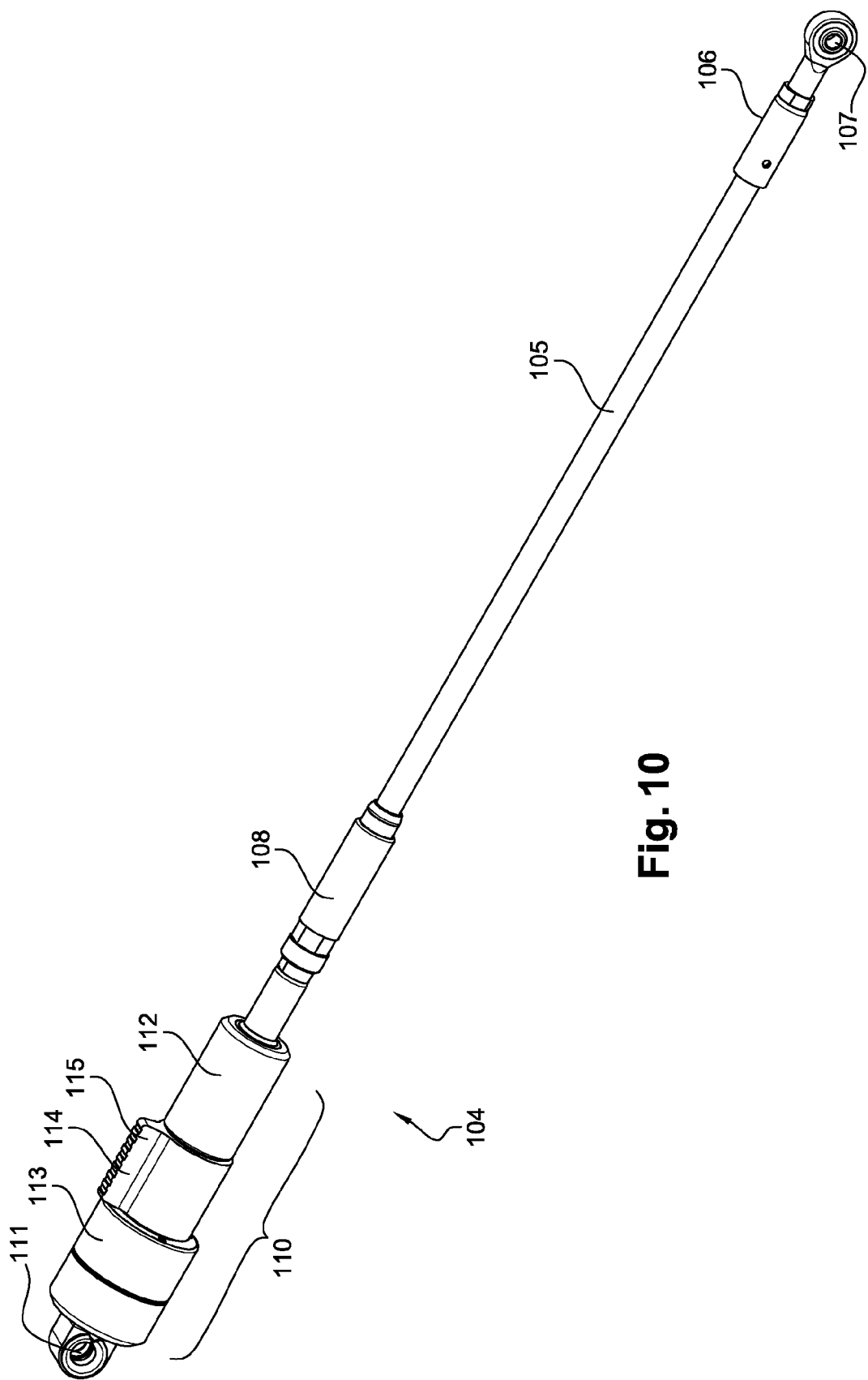
FIG. 10 is a summary perspective view of a damping system with a hydraulic device according to a second embodiment.

More accurately, and as illustrated in FIG. 10, hydraulic device 110 includes a first part 112 comprising a first cylinder receiving the end of arm 105. Near the attaching point 111, the hydraulic device 110 includes a second cylinder having a larger diameter, 113, enclosing a complementary chamber. Between the two cylinders 100 and 113 there is a hollow rotating part 114 having a prominent area 115 which can be operated by hand and allowing the rotation of the device 114 about the main axis which is parallel to arm 105. This rotating part 114 encloses the main chamber inside which piston 123 connected to end 108 of arm 105 moves.

Figure 11:
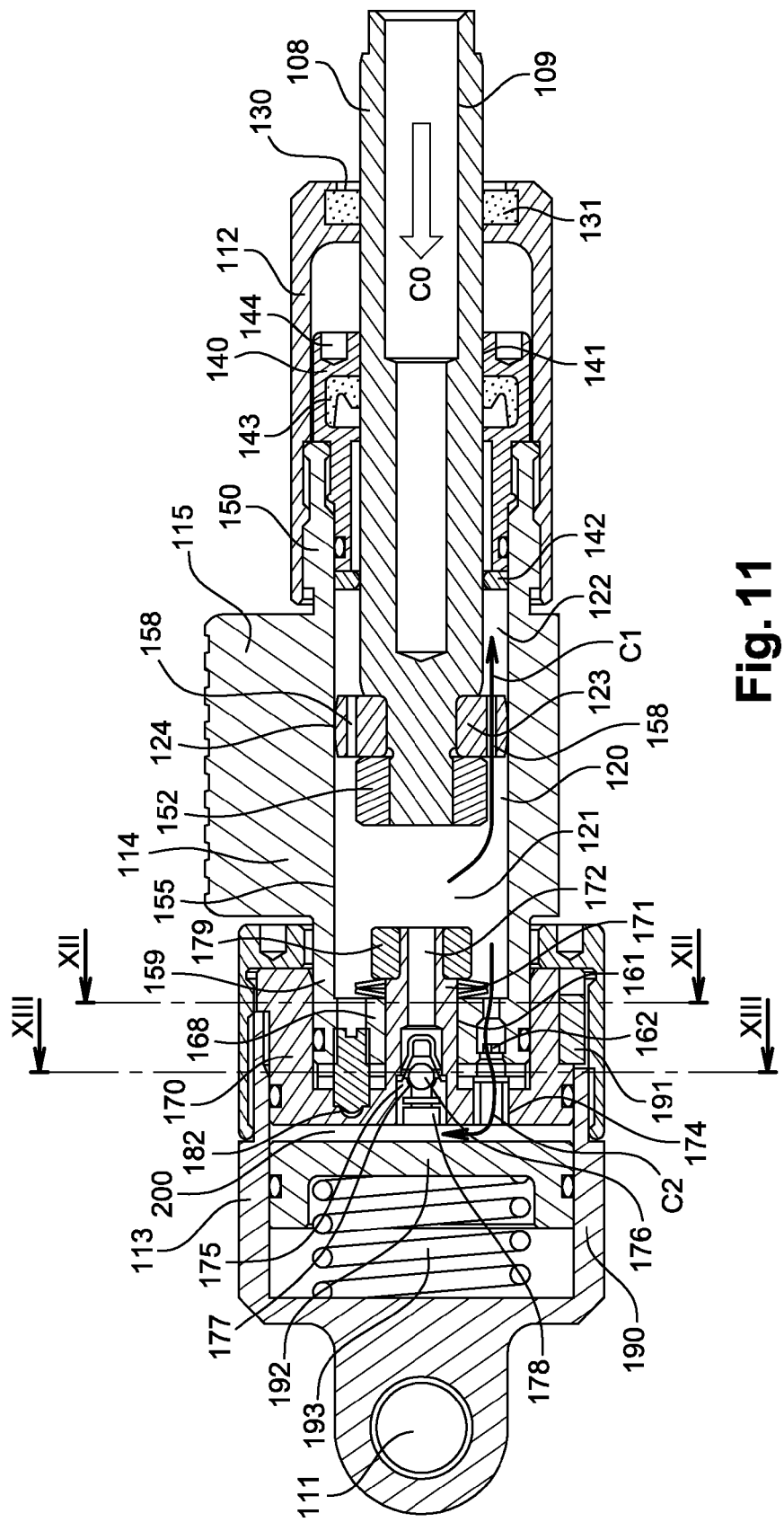
FIG. 11 is a longitudinal sectional view of the hydraulic device shown in FIG. 10, illustrating the flows of the fluid during a board bending movement.
Figure 11A:
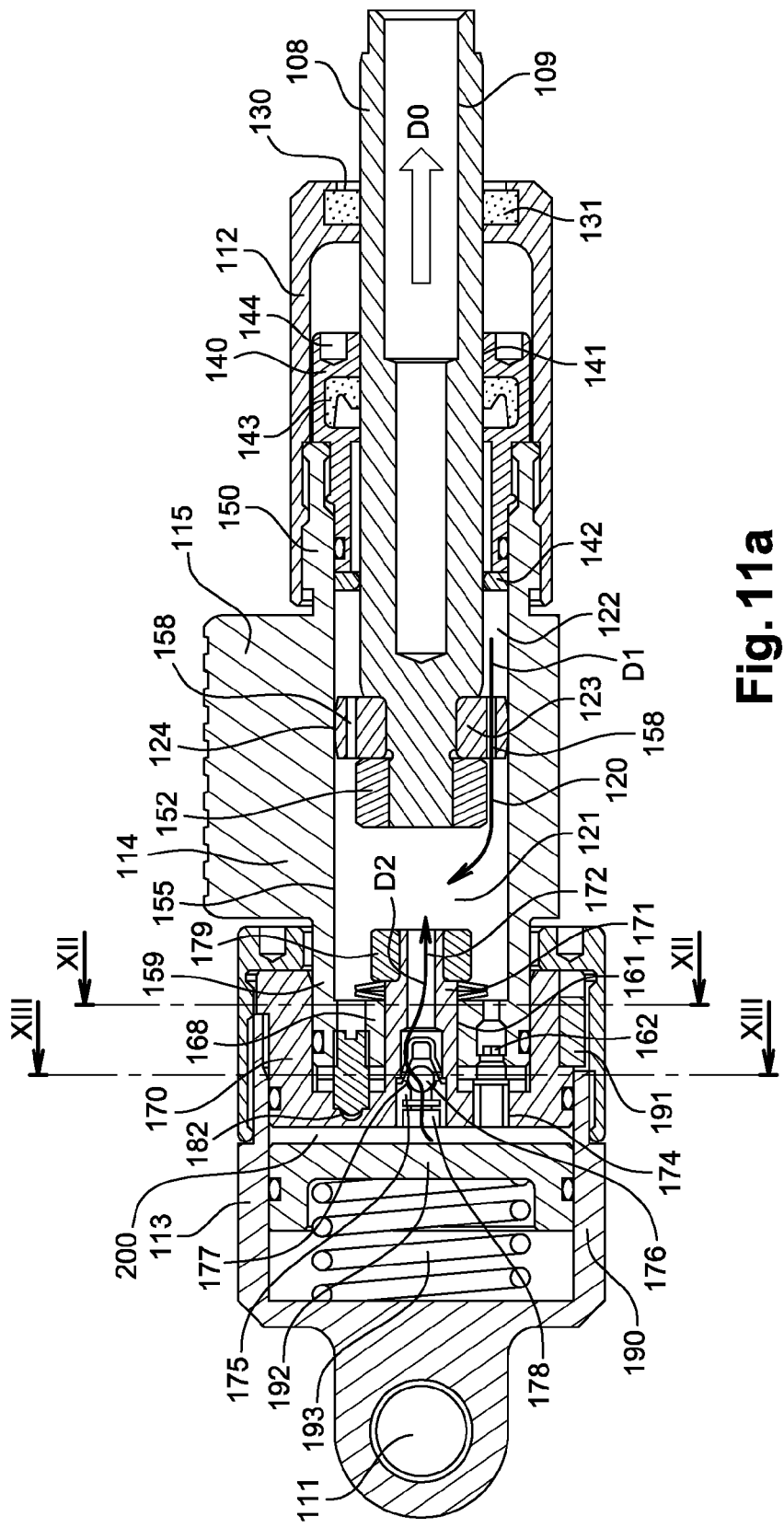
FIG. 11a is an identical view to FIG. 11, illustrating the flow of fluid during a counter-bending movement of the board.

The internal composition of the hydraulic device is essentially illustrated in FIG. 11. More specifically, part 112 has an opening 130 containing a seal 131 allowing the end 108 of the arm 105 to be inserted into the damper 110. More specifically, end 108 can be screwed onto the end of arm 105 in a tapped hole 109 provided for this purpose. Various devices are included inside part 112 to guide part 108 in its required translation, combined with optimal sealing. More accurately, part 112 screws onto end 150 of rotary part 114 by the outside threading of the latter. Part 112 covers part 140 which has a cylindrical hole 141 in which end 108 is able to slide thanks to a sliding bearing 142, preferably of PTFE, to decrease friction, combined with a circular lip seal 143 ensuring tightness.

The outer face of part 140 has threading working together with end 150 of rotary part 114. More specifically, this part 114 has a central hole defining the main chamber 120 inside which piston 123 mounted to the end of part 108 is able to slide. This piston 123 is locked in its translation movement by a nut 152 on part 108 extending arm 105. On its outer face, piston 123 has a shape providing good tightness by sliding on the inner surface 155 of the hollow forming the main chamber 120. A circular seal can also be used for this purpose.

In this way, the rotation of rotary part 114 causes the rotation of the parts integral with it, and more particularly the parts 140 and 112.

As illustrated in FIG. 11, piston 123 has an axial hole drilled into it forming channels 158 for bringing the two chambers with their variable volumes to connect, as defined from main chamber 120 either side of piston 123. More specifically, a compression chamber 121 is defined as being the chamber in which the pressure increases when piston 123 is pushed into the hydraulic device towards the end 111. The relief chamber 122, is a chamber in which the pressure increases when the piston moves with the lengthening of arm 105 towards the end of arm 106.

The opposite end of main chamber 120 is blanked by part 170 mounted to the end 159 of part 114 having a central hollow 161 into which axial tube 171 of part 170 is inserted. This tube 171 is hollow, defining a passage channel 172 connecting compression chamber 121 to an anti-return valve device 175.

The anti-return valve includes, for instance, a ball 176 and a spherical bearing 177 working together with ball 176 so that fluid can pass from channel 178 formed on the outer face of part 170 towards channel 172 connected to compression chamber 121. A locking nut 179 combined with a compressible washer serves to lock part 170 onto the end of rotary part 114. Part 170 is attached to the ski and the rotary part 114 turns about part 117.

Figure 12:
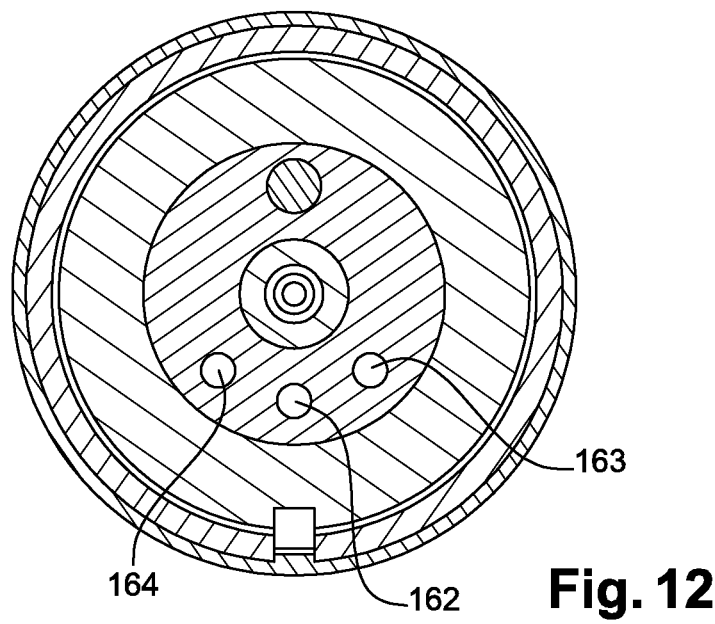
FIGS. 12 to 13 are transverse sectional views in the planes XII-XII' and XIII-XIII' of FIG. 11.

As a complement, end 159 of rotary part 114 has a hole 162 into which a calibrated hydraulic restriction is installed, forming a flow reducer. More accurately, and as shown in FIG. 12, end 159 of the rotary part includes three holes 162, 163, 164, angularly offset with respect to the axis of rotation of part 114. These three holes 162, 163, 164 are provided with hydraulic restrictions of different diameters, typically ranging between 0.25 and 0.55 mm.

Figure 13:
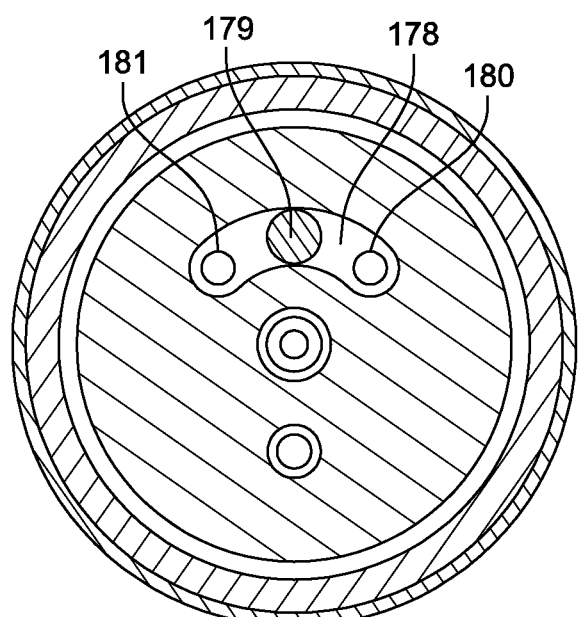

Part 170 covering the end of portion 159 also includes, as shown in FIG. 13, a hole in the form of a circle are 178 at the bottom of which there are three partially spherical housings 179, 180, 181, in which an indexing device 182 is inserted, integral with rotary part 114. In this way, during the angular movement of rotary part 114 with respect to the ski, and more specifically with respect to part 170, the various hydraulic restrictions 162, 163, 164 in turn move in front of opening 174 connecting to the complementary chamber described below. The position of part 170 is indexed by cooperation between device 182 and the housings 179, 180, 181 in which the end of part 182 is inserted, under the effect of a return device (not shown).

A bell 190 is placed over part 170, inside which it is held in an angular position indexed by a shim 91. The bell-shaped part 190 also contains a piston 192 and a return spring 193 operating by compression and opposing the moment of piston 192 towards the bottom of the bell-shaped part 190.

Inside the bell-shaped part 190, and with the face opposite part 170, piston 192 defines a complementary chamber 200, hydraulically connected to compression chamber 121 by virtue of hydraulic restriction 162 and anti-return valve 175. The bell-shaped part 190 is held in its swiveling link position with respect to the ski by means of the attaching portion 111.

In the normal operating mode, when arm 105 and therefore its end move according to the arrow C0 towards the opposite attaching point 111, under the effect of the bending of the ski, piston 113 moves, reducing the volume of compression chamber 121. Part of the fluid contained in compression chamber 121 enters relief chamber 122 via the hydraulic channels 158 drilled through the piston in the direction of arrow C1. The volume displaced by piston 123 in compression chamber 121 is greater than the volume displaced in relief chamber 122 so that part of the volume from the compression chamber is pushed back into complementary chamber 200, in the direction of arrow C2 by means of the hydraulic restriction 162 while the ball 176 blocks the anti-return valve 175. This compresses spring 193 and moves piston 192 towards the bottom of the bell-shaped part 190. The load losses generated by the passage of fluid in hydraulic restriction 162 cause a loss of energy and therefore damp the bending moment of the ski.

Conversely, when the ski bends in the opposite direction and when arm 105 moves (in the direction of arrow D0), so that the piston decreases the volume in the relief chamber 122, the fluid in the relief chamber moves towards compression chamber 121 through the hydraulic channels 158 according to arrow D1 in FIG. 12. In parallel, fluid is drawn in from the complementary chamber 200 towards the compression chamber 121, in the direction of arrow D2, for the greater part through the anti-return valve 175 which is no longer locked by ball 176 and very partially through restriction 162.

Accordingly, the generated load losses are less than in the opposite movement and damping is therefore more limited, depending on the load losses generated by hydraulic channels 158 drilled into piston 123. Thus, the ski tends to be damped less by the counter-bending phenomena and more quickly recovers its position of contact with the snow. Accordingly, the hydraulic paths which are active during the bending movements (arrows C1 and C2) and counter-bending movements (arrows D1+D2) are different with the first generating more load losses and therefore causing stronger damping.

As already mentioned, rotary part 114 forming main chamber 120 can be moved angularly by manual action on fin 115 so that the hydraulic restriction opposite passage 174 is replaced by a larger or smaller diameter restriction, thus generating greater or lesser load losses and a different damping effect for the ski bending movements. Naturally, the number of positions and the respective load losses can be arranged according to the desired damping performance.

Similarly, other mechanisms combining to hydraulic paths generating different load losses depending on the flow direction of the fluid could be considered.

Naturally, the damping system described above could be installed behind the attachment to limit the ski tail movements.

From the above, it is evident that the board conforming to the presently described embodiments offers advantageous behaviour because it brakes the upward movement of the ski tip because of considerable damping, to prevent the board from becoming more difficult to control. This is combined, on the contrary, with fast return of the ski tip to its low position near or in contact with the snow, with less damping.

This means that the board offers better reaction and more accurate control. The board tends to keep to the path on which it is directed by the user so that the edge of the board remains anchored into the snow. This makes the board faster and offers better performance.

The invention claimed is:

1. A gliding board with a vertical movement damping system in the front or rear zone of the board, said system including an arm the first end of which is integral with an attaching point located in the front or rear zone of the board and whose second end is integral with a piston of a hydraulic device connected to the board near the attaching point, said hydraulic device applying a damping force during a movement of the second end of the arm in order to dissipate part of the kinetic energy from the front or rear zone of the board transmitted by said arm, wherein when the arm moves responsive to a downward movement of the attaching point corresponding to a counter-bending movement of the board, the damping force applied by the hydraulic device is less than the damping force applied when the arm moves responsive to an upward movement of the attaching point corresponding to a board bending movement.

2. The gliding board according to claim 1, wherein the attaching point is located in the front zone, and wherein the hydraulic device is placed in front of an attaching stop.

3. The gliding board according to claim 1, wherein the first end is connected to the front or rear zone of the board by a swiveling link.

4. The gliding board according to claim 1, wherein the hydraulic device is connected to the board by a swiveling link.

5. The gliding board according to claim 1, wherein the hydraulic device includes a system for adjusting the damping force generated during the bending movements of the board.

6. The gliding board according to claim 1, wherein the hydraulic device includes first and second hydraulic paths that generate different load losses, the first hydraulic path comprising a first circuit in which the fluid contained in the hydraulic device circulates during the board bending movement, and the second hydraulic path comprising a second circuit in which the fluid contained in the hydraulic device circulates during the counter-bending movement of the board.

7. The gliding board according to claim 6, wherein the hydraulic device includes a main chamber inside which the piston can move with said piston dividing said main chamber into a compression chamber and a relief chamber, and wherein the first and second hydraulic paths connect the compression chamber and relief chamber with the first and second hydraulic paths working in opposite circulating directions.

8. The gliding board according to claim 7, wherein the first and second hydraulic paths each have an anti-return valve with the two valves mounted in opposite directions.

9. The gliding board according to claim 7, wherein the first and second hydraulic paths each have a flow reducer with the two flow reducers having different sections.

10. The gliding board according to claim 9, wherein the flow reducers each include a grub screw whose position is adjustable.

11. The gliding board according to claim 7, wherein the main chamber is connected to a compensation chamber arranged to receive the fluid from the main chamber when it expands.

12. The gliding board according to claim 1, wherein the hydraulic device includes:
   a main chamber inside which the piston can move, said piston dividing the main chamber into a compression chamber and a relief chamber, said piston being drilled with at least one hydraulic channel connecting the compression and relief chambers; and
   a complementary chamber having a variable volume connected to the compression chamber by an anti-return valve and a hydraulic restriction.

13. The gliding board according to claim 12, wherein the hydraulic device has a mechanism for adjusting the diameter of the hydraulic restriction.

14. The gliding board according to claim 12, wherein the main chamber is connected to a compensation chamber arranged to receive the fluid from the main chamber when it expands.

15. The gliding board according to claim 1, wherein the damping system includes means of limiting the stroke of the arm in the event of the attaching point moving downward.

16. Gliding board according to claim 15, wherein the limiting means include a stop mounted on the arm, and which is suitable for coming into contact with a fixed portion of the hydraulic device.

17. The gliding board according to claim 1, wherein the first end is connected to the front or rear zone of the board by a first swiveling link, and wherein the hydraulic device is connected to the board by a second swiveling link different from the first swiveling link.

18. The gliding board according to claim 1, wherein the hydraulic device includes:
   a body defining a main chamber inside which the piston can move, said piston dividing the main chamber into a compression chamber and a relief chamber, the compression chamber and the relief chamber being in fluid communication with one another via (i) a first intermediate chamber formed in the body when the arm moves responsive to the downward movement of the attaching point, and (ii) a second intermediate chamber formed in the body when the arm moves responsive to the upward movement of the attaching point.

19. The gliding board according to claim 18, wherein the compression chamber is in fluid communication with the first intermediate chamber via a first channel and the compression chamber is in fluid communication with the second intermediate chamber via a second channel.

* * * * *